United States Patent

Kraushaar-Czarnetzki et al.

[11] Patent Number: 5,853,566
[45] Date of Patent: *Dec. 29, 1998

[54] ZEOLITE-BETA CONTAINING CATALYST COMPOSITIONS AND THEIR USE IN HYDROCARBON CONVERSION PROCESSES FOR PRODUCING LOW BOILING POINT MATERIALS

[75] Inventors: Bettina Kraushaar-Czarnetzki; Johannes Wijnbelt, both of Amsterdam, Netherlands

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 755,989

[22] Filed: Nov. 25, 1996

[30] Foreign Application Priority Data

Nov. 28, 1995 [EP] European Pat. Off. ............ 95203269

[51] Int. Cl.$^6$ .................................. C10G 47/16
[52] U.S. Cl. ............................ 208/109; 502/66; 502/67; 502/68; 502/69; 502/74; 208/134; 208/135; 208/136; 208/137; 208/138; 208/110; 585/752
[58] Field of Search ................................ 502/66, 67, 68, 502/69, 74; 208/134, 135, 136, 137, 138, 109, 110; 585/752

[56] References Cited

U.S. PATENT DOCUMENTS

| | | | |
|---|---|---|---|
| 5,279,726 | 1/1994 | Ward | 208/111 |
| 5,284,573 | 2/1994 | LaPierre et al. | |
| 5,413,977 | 5/1995 | Occelli | 502/68 |
| 5,479,810 | 1/1996 | Degnan et al. | 502/64 |
| 5,536,687 | 7/1996 | Ward | |

FOREIGN PATENT DOCUMENTS

| | | | |
|---|---|---|---|
| 0559646 | 5/1991 | European Pat. Off. | B01J 29/06 |
| WO 91/17829 | 11/1991 | WIPO | |
| WO 92/09366 | 6/1992 | WIPO | |
| WO 94/26847 | 5/1994 | WIPO | C10G 47/16 |

*Primary Examiner*—Walter D. Griffin
*Assistant Examiner*—Nadine Preisch

[57] ABSTRACT

The present invention provides a catalyst composition, and a hydrocarbon conversion process in which it is used, comprising as first cracking component a zeolite beta having a silica to alumina molar ratio of at least 20 which is in the form of crystals less than 100 nm in size; a second cracking component selected from (i) crystalline molecular sieves having pores with diameters greater than 0.6 nm, (ii) crystalline, mesoporous aluminosilicates having pores with diameters of at least 1.3 nm, and (iii) clays; and at least one hydrogenation component.

16 Claims, No Drawings

ZEOLITE-BETA CONTAINING CATALYST COMPOSITIONS AND THEIR USE IN HYDROCARBON CONVERSION PROCESSES FOR PRODUCING LOW BOILING POINT MATERIALS

FIELD OF THE INVENTION

The present invention relates to catalyst compositions and hydrocarbon conversion processes in which they are used.

BACKGROUND OF THE INVENTION

Of the many conversion processes known in the refining art, hydrocracking has assumed a greater importance over the years since it offers the refiner product flexibility combined with product quality.

There has been considerable effort devoted to the development of hydrocracking catalysts which combine high cracking activity with a low tendency to overcrack towards light products and, in particular, less valuable $C_1$–$C_3$ gaseous by-products.

Kerosene or gas oil (middle distillates) are often the desired products of a hydrocracking process. However, hydrocracking catalysts with a high selectivity towards middle distillates tend to have a low cracking activity. Such catalysts are typically based on a single, active cracking component such as an aluminosilicate, especially a Y zeolite component.

It would be desirable to have a hydrocracking catalyst with a low gas make having still further improved activity. More particularly, it would be desirable to have a middle distillate selective hydrocracking catalyst having better activity.

It is known, e.g. from U.S. Pat. No. 5,279,726 and EP-B-559 646, to form composites of two different aluminosilicates, a Y zeolite and zeolite beta, for use in hydrocracking.

More specifically, in U.S. Pat. No. 5,279,726 a hydrocracking catalyst is disclosed having high activity and selectivity for gasoline which comprises a hydrogenation component on a catalyst support comprising both zeolite beta and a Y zeolite having a unit cell size above about 2.440 nm (24.40 Ångstroms), the zeolites usually and preferably being in further combination with a porous, inorganic refractory oxide such as alumina.

The zeolite beta used in the catalyst support has a silica to alumina molar ratio of at least 10 up to 100, but preferably no more than 40 and most preferably in the range of 20 to 30. Preferably, the zeolite beta has a crystal size of 0.1 to 0.7 micron (100 to 700 nm), a surface area of 500 to 800 m²/g and a cyclohexane adsorption capacity of 15 to 25 g/100 g.

The Y zeolite used in the catalyst support preferably has a unit cell size between 2.445 and 2.464 nm (24.45 and 24.64 Ångstroms) and, typically, a sorptive capacity for water vapor at 25° C. and a p/p$_o$ value of 0.1 of at least 15% w (percent by weight), as exemplified by LZY-82 and LZY-84 zeolites.

U.S. Pat. No. 5,279,726 contains a single example which details the preparation and testing of four hydrocracking catalysts numbered one (1), two (2), three (3) and four (4). All of the catalysts contained the same amount and type of hydrogenation components but differed in their catalyst supports. Catalyst 1 contained a catalyst support of 80% w zeolite beta (silica to alumina molar ratio 26) and 20% w alumina; Catalyst 2 contained a catalyst support of 40% w zeolite beta (silica to alumina molar ratio 26), 40% w LZ-10 zeolite (silica to alumina molar ratio 5.2; unit cell size 2.430 nm) and 20% w alumina; Catalyst 3 contained a catalyst support of 40% w zeolite beta (silica to alumina molar ratio 26), 40% w LZY-82 zeolite (silica to alumina molar ratio 5.7; unit cell size 2.455 nm) and 20% w alumina; and Catalyst 4 contained a catalyst support of 80% w LZY-82 zeolite (silica to alumina molar ratio 5.7; unit cell size 2.455 nm) and 20% w alumina. Catalysts 1, 2 and 4 were comparative catalysts whilst Catalyst 3 was a catalyst according to the invention.

When the hydrocracking performances of the catalysts were assessed under second stage series-flow conditions (referred to in U.S. Pat. No. 5,279,726 as first stage simulation under ammonia-rich conditions), the results in Table II, Column 14 show that Catalyst 3 of the invention yielded more gasoline than comparative Catalyst 4 (a commercial gasoline hydrocracking catalyst) with some slight reduction in the amount of $C_1$–$C_3$ gaseous by-product.

Similarly, EP-B-559 646 discloses a hydrocracking catalyst having high activity and selectivity for gasoline which comprises a hydrogenation component on a catalyst support comprising both zeolite beta and a dealuminated Y zeolite having an overall silica to alumina molar ratio greater than 6.0. The support may further contain a porous, inorganic refractory oxide such as alumina or silica-alumina.

The zeolite beta used in the catalyst support has a silica to alumina molar ratio of at least 10 up to 100, but preferably no more than 40 and most preferably in the range of 20 to 30. Preferably, the zeolite beta has a crystal size of 0.1 to 0.7 micron (100 to 700 nm), a surface area of 500 to 800 m²/g and a cyclohexane adsorption capacity of 15 to 25 g/100 g.

The dealuminated Y zeolite used in the catalyst support preferably has an overall silica to alumina molar ratio between 6.1 and 20.0, and most preferably between 8.0 and 15.0. The unit cell size for the dealuminated Y zeolite is normally between 2.440 and 2.465 nm (24.40 and 24.65 Ångstroms). The preferred dealuminated Y zeolites to use are the LZ-210 zeolites as described in U.S. Pat. No. 4,503,023 and U.S. Pat. No. 4,711,770.

There is a single example in EP-B-559 646 which details the preparation and testing of four hydrocracking catalysts numbered one (1), two (2), three (3) and four (4). All of the catalysts contained the same amount and type of hydrogenation components but differed in their catalyst supports. Catalyst 1 contained a catalyst support of 80% w zeolite beta (silica to alumina molar ratio 26) and 20% w alumina; Catalyst 2 contained a catalyst support of 30% w zeolite beta (silica to alumina molar ratio 26), 50% w LZ-210 zeolite (silica to alumina molar ratio 12; unit cell size 2.441 nm) and 20% w alumina; Catalyst 3 contained a catalyst support of 30% w zeolite beta (silica to alumina molar ratio 26), 50% w LZ-10 zeolite (silica to alumina molar ratio 5.2; unit cell size 2.430 nm) and 20% w alumina; and Catalyst 4 contained a catalyst support of 80% w LZY-82 zeolite (silica to alumina molar ratio 5.7; unit cell size 2.455 nm) and 20% w alumina. Catalysts 1, 3 and 4 were comparative catalysts whilst Catalyst 2 was a catalyst according to the invention.

When the hydrocracking performances of the catalysts were assessed under second stage series-flow conditions (referred to in EP-B-559 646 as first stage simulation under ammonia-rich conditions), the results in Table 3 show that whilst Catalyst 2 of the invention produced the highest yield of gasoline of the catalysts tested, it also produced a significant amount of undesired $C_1$–$C_3$ gaseous by-product.

Indeed, Catalyst 2 produced more gaseous by-product (i.e. had a higher gas make) than comparative Catalyst 4 (a commercial gasoline hydrocracking catalyst) which is known to yield high gas makes.

In WO 94/26847 a process is disclosed for simultaneously hydrocracking, hydrodesulphurizing and hydrodenitrogenating a hydrocarbonaceous feed by contacting a feedstock which contains sulphur compounds and nitrogen compounds, has a boiling range of more than 80% v boiling above 300° C., and has not been subjected to any preparatory catalytic hydrodesulphurization or hydrodenitrogenation, at elevated temperature and pressure, in the presence of hydrogen, with a catalyst containing a carrier such as alumina or silica-alumina, a Group VIB metal component, a Group VIII metal component, and an inorganic, crystalline, non-layered aluminosilicate with pores of diameter greater than 1.3 nm and exhibiting, after calcination, an X-ray diffraction pattern with at least one peak at a d-spacing greater than 1.8 nm such as an aluminosilicate as described in WO 93/02159, in particular the aluminosilicate designated MCM-41.

Although it is indicated in Page 7, lines 15 to 19 of WO 94/26847 that other molecular sieves may be incorporated into the catalyst in addition to the aluminosilicate, such as Y zeolites, ultrastable Y zeolites having a unit cell size ($a_o$) of from 2.425 to 2.440 nm (24.25 to 24.40 Ångstroms), zeolite beta, mordenite, and materials of the ZSM-5 type having a silica to alumina ratio in the range of 12 to 300, there are no examples in WO 94/26847 of the preparation and testing of any such composite catalysts, nor any suggestion to use a specific zeolite beta for this purpose.

Furthermore, it is known from WO 91/17829 to hydrocrack feedstocks using a catalyst which comprises a hydrogenation component and a support comprising zeolite beta and a Y zeolite having either (i) a unit cell size below 2.445 nm (24.45 Ångstroms) or (ii) a water vapor sorptive capacity at 25° C. and a $p/p_o$ value of 0.10 of less than 10.00% w, the zeolites usually and preferably being in further combination with a porous, inorganic refractory oxide such as alumina.

The zeolite beta present in the catalyst support has a silica to alumina molar ratio of at least 10 up to 100, but preferably no more than 40 and most preferably in the range of 20 to 30. Preferably the zeolite beta has a crystal size of 0.1 to 0.7 micron (100 to 700 nm), a surface area of 500 to 800 $m^2/g$ and a cyclohexane adsorption capacity of 15 to 25 g/100 g.

Preferred Y zeolites to use are those meeting both of the above requirements (i) and (ii), for example, ultrahydrophobic Y (UHP-Y) zeolites as exemplified by LZ-10 zeolite. The hydrocracking catalyst according to WO 91/17829 may, depending on the process conditions selected, be used for gasoline or middle distillates production. However, the catalyst is apparently better suited for gasoline production.

U.S. Pat. No. 5,413,977 discloses a hydrocracking catalyst having high activity and selectivity for gasoline which comprises a hydrogenation component on a catalyst support comprising zeolite beta and a layered magnesium silicate including hectorite and saponite (which are both smectite minerals) and, especially, sepiolite.

The zeolite beta used in the catalyst support has a silica to alumina molar ratio of at least 10 up to 100, but preferably no more than 40 and most preferably in the range of 20 to 30. Preferably the zeolite beta has a crystal size of 0.1 to 0.7 micron (100 to 700 nm), a surface area of 400 to 800 $m^2/g$, a cyclohexane adsorption capacity of 15 to 25 g/100 g, and a water vapor sorptive capacity at 25° C. and a $p/p_o$ value of 0.10 of greater than 5% w.

SUMMARY OF THE INVENTION

In accordance with the present invention there is therefore provided a catalyst composition comprising as first cracking component a zeolite beta having a silica to alumina molar ratio of at least 20 which is in the form of crystals less than 100 nm in size; a second cracking component selected from (i) crystalline molecular sieves having pores with diameters greater than 0.6 nm, (ii) crystalline, mesoporous aluminosilicates having pores with diameters of at least 1.3 nm, and (iii) clays; and at least one hydrogenation component.

DETAILED DESCRIPTION OF THE INVENTION

It has now surprisingly been found possible to prepare a middle distillate selective hydrocracking catalyst having improved activity that is a composite catalyst. More particularly, it has been found that advantageous results in terms of high middle distillate yields and low gas make can be obtained using a composite catalyst which comprises a specific type of zeolite beta having a relatively high silica to alumina molar ratio and a relatively small crystal size in combination with another active cracking component.

The catalyst composition of the invention is also advantageous in that it possesses good stability.

The first cracking component is a zeolite beta having a silica to alumina molar ratio of at least 20 which is in the form of crystals less than 100 nm in size.

In the present specification, unless otherwise stated, the silica to alumina molar ratio of a zeolite is the molar ratio as determined on the basis of the total or overall amount of aluminum and silicon (framework and non-framework) present in the zeolite.

Preferably the zeolite beta has a silica to alumina molar ratio of at least 40, more preferably at least 60, still more preferably at least 80 and most preferably at least 100. For example, the zeolite beta may have a silica to alumina molar ratio in the range from 20 to 150, preferably in the range from 50 to 150 and especially in the range from 100 to 150. Very advantageous results have been obtained using a zeolite beta have a silica to alumina molar ratio in the range from 100 to 120.

The zeolite beta used in the catalyst composition of the invention is in the form of crystals less than 100 nm in size, e.g. up to 99 nm in size. The zeolite beta preferably has crystal sizes in the range from 20 to 95 nm, more preferably in the range from 20 to 70 nm and particularly in the range from 30 to 50 nm.

The second cracking component of the catalyst composition is selected from (i) crystalline molecular sieves having pores with diameters greater than 0.6 nm (e.g as determined by nitrogen adsorption techniques), (ii) crystalline, mesoporous aluminosilicates having pores with diameters of at least 1.3 nm (e.g. as determined by nitrogen adsorption techniques), and (iii) clays. In the context of the present specification, the term "molecular sieve" also includes the corresponding (hydrothermally) stabilized and dealuminated derivatives and such derivatives as may be obtained by isomorphous substitution and cation exchange. Methods for the cation exchange, (hydrothermal) stabilization, dealumination and isomorphous substitution of molecular sieves are well known in the art and are not therefore further discussed in the present specification.

The second cracking component may be a single material (i), (ii) or (iii) or a combination of two of more such materials.

Preferably, the second cracking component is selected from (i) crystalline molecular sieves of structure type FAU, EMT, MOR, LTL, MAZ, MTW, OFF, BOG, AET, AFI, AFO, AFR, AFS, AFY, ATS, VFI and CLO as described in "Atlas of Zeolite Structure Types", 3rd Edition, published in 1992 on behalf of the Structure Commission of the International Zeolite Association; (ii) crystalline, mesoporous aluminosilicates of structure type MCM-41 and MCM-48 as described in U.S. Pat. No. 5 215 737 or of structure type FSM-16 as described by S. Inagaki, Y. Fukushima and K. Kuroda, Stud. Surf. Sci. Catal., Vol. 84A (1994), Pages 125–132; and (iii) clays of the non-pillared smectite type, e.g. montmorillonites, hectorites, saponites and beiddelites.

Most preferably, the second cracking component is (i) a crystalline molecular sieve of structure type FAU (e.g. a very ultrastable zeolite Y (VUSY) of unit cell size ($a_o$) less than 2.440 nm (24.40 Ångstroms), in particular less than 2.435 nm (24.35 Ångstroms) as are known, for example, from EP-A-247 678 and EP-A-247 679) or (ii) a crystalline, mesoporous aluminosilicate of structure type MCM-41. The VUSY zeolite of EP-A-247 678 or EP-A-247 679 is characterized by a unit cell size below 2.445 nm (24.45 Ångstroms) or 2.435 nm (24.35 Ångstroms), a water adsorption capacity (at 25° C. and a $p/p_o$ value of 0.2) of at least 8% w of the zeolite and a pore volume of at least 0.25 ml/g wherein between 10% and 60% of the total pore volume is made up of pores having a diameter of at least 8 nm.

The catalyst composition of the invention comprises at least one hydrogenation component. Examples of hydrogenation components that may suitably be used include Group VI (e.g. molybdenum and tungsten) and Group VIII metals (e.g. cobalt, nickel, iridium, platinum and palladium), their oxides and sulphides. The catalyst composition will preferably contain at least two hydrogenation components, e.g. a molybdenum and/or tungsten component in combination with a cobalt and/or nickel component. Particularly preferred combinations are nickel/tungsten and nickel/molybdenum. Very advantageous results are obtained when these metal combinations are used in the sulphide form.

The present catalyst composition may contain up to 50 parts by weight of hydrogenation component, calculated as metal per 100 parts by weight (dry weight) of total catalyst composition. For example, the catalyst composition may contain from 2 to 40, more preferably from 5 to 30 and especially from 10 to 20, parts by weight of Group VI metal(s) and/or from 0.05 to 10, more preferably from 0.5 to 8 and advantageously from 1 to 6, parts by weight of Group VIII metal(s), calculated as metal per 100 parts by weight (dry weight) of total catalyst composition.

The catalyst composition according to the present invention may, if desired, further comprise a binder, in particular an inorganic oxide binder. Examples of suitable binders include alumina, silica, aluminum phosphate, magnesia, titania, zirconia, silica-alumina, silica-zirconia, silica-boria and mixtures thereof. Alumina is the most preferred binder.

Preferably, the catalyst composition of the invention comprises the first cracking component, the second cracking component and binder in amounts of from 0.5 to 40% w first cracking component, from 0.5 to 90% w second cracking component and from 0 to 99% w binder, all percentages by weight (% w) being calculated on the basis of the combined dry weight of the first cracking component, second cracking component and binder.

A particularly preferred catalyst composition of the invention is that comprising from 1 to 15% w first cracking component, from 5 to 80% w second cracking component and the balance made up of binder, all percentages by weight (% w) being calculated on the basis of the combined dry weight of the first cracking component, second cracking component and binder.

The present catalyst composition may be prepared in accordance with techniques conventional in the art.

For example, the first and second cracking components optionally together with binder may be co-mulled in the presence of one or more solutions of Group VI and/or Group VIII hydrogenation metal salts to form a mixture which is then extruded into pellets and calcined (co-mulling method).

Alternatively, if the hydrogenation component is platinum and/or palladium, the metals may be loaded onto the cracking components by means of cation exchange or pore volume impregnation. The metal-loaded cracking components thus obtained, optionally together with binder, may then be extruded into pellets and calcined.

However, it is preferred if the first and second cracking components optionally together with binder are mulled in the presence of water and a peptizing agent, e.g. acetic acid, to form a mixture which is then extruded into pellets and calcined. The pellets thus obtained are then impregnated with one or more solutions of Group VI and/or Group VIII hydrogenation metal salts and further calcined (post-impregnation method).

The present invention also provides a process for converting a hydrocarbonaceous feedstock into lower boiling materials which comprises contacting the feedstock with hydrogen at elevated temperature and elevated pressure in the presence of a catalyst composition according to the present invention.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. The feedstock will generally comprise hydrocarbons having a boiling point of at least 330° C. The boiling range will generally be from about 330° to 650° C., with preference being given to feedstocks having a boiling range of from about 340° to 620° C. The feedstock may have a nitrogen content of up to 5000 ppmw (parts per million by weight) and a sulphur content of up to 6% w. Typically, nitrogen contents are in the range from 250 to 2000 ppmw and sulphur contents are in the range from 0.2 to 5% w. It is possible and may sometimes be desirable to subject part or all of the feedstock to a pre-treatment, for example, hydrodenitrogenation, hydrodesulphurization or hydrodemetallization, methods for which are known in the art.

The process of the invention may conveniently be carried out at a reaction temperature in the range from 250° to 500° C., preferably in the range from 300° to 450° C.

The present process is preferably carried out at a total pressure (at the reactor inlet) in the range from $3 \times 10^6$ to $3 \times 10^7$ Pa (30 to 300 bar), more preferably from $4 \times 10^5$ to $2.5 \times 10^7$ Pa (40 to 250 bar) and even more preferably from $8 \times 10^6$ to $2 \times 10^7$ Pa (80 to 200 bar).

The hydrogen partial pressure (at the reactor inlet) is preferably in the range from $3 \times 10^6$ to $2.9 \times 10^7$ Pa (30 to 290 bar), more preferably from $4 \times 10^6$ to $2.4 \times 10^7$ Pa (40 to 240 bar) and still more preferably from $8 \times 10^6$ to $1.9 \times 10^7$ Pa (80 to 190 bar).

A space velocity in the range from 0.1 to 10 kg feedstock per liter catalyst per hour (kg.l$^{-1}$.h$^{-1}$) is conveniently used. Preferably the space velocity is in the range from 0.1 to 8, particularly from 0.2 to 5 kg.l$^-$.h$^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will be further understood from the following illustrative examples in which the silica to alumina molar ratio of an aluminosilicate (zeolite) was determined on the basis of the total amount of aluminum and silicon (framework and non-framework) present in the zeolite and the unit cell size ($a_o$) of an aluminosilicate (zeolite) was determined according to standard test method ASTM D 3942-80. Furthermore, the boiling points and density of the hydrocarbonaceous feedstock were determined according to standard test methods ASTM D 86 and D 1298 respectively.

EXAMPLE 1

(i) A catalyst composition according to the present invention was prepared by combining a zeolite beta (12.6 g) having a silica to alumina molar ratio of 114 and a crystal size in the range 30 to 50 nm (300 to 500 Ångstroms) with a very ultrastable zeolite Y (VUSY) according to EP-A-247 678 and EP-A-247 679 (58.4 g) having a silica to alumina molar ratio of 9.9 and a unit cell size ($a_o$) of 2.431 nm (24.31 Ångstroms) and with alumina (53.7 g). Water and acetic acid were added and the resulting mixture was mulled and then extruded, together with an extrusion aid, into pellets of cylindrical shape. The pellets were dried statically for 2 hours at 120° C. and then calcined for 2 hours at 530° C. The pellets so obtained had a circular end surface diameter of 1.6 mm and a water pore volume of 0.695 ml/g. The pellets comprised 10% w zeolite beta (first cracking component), 50% w VUSY zeolite (second cracking component) and 40% w alumina (binder), on a dry weight basis.

(ii) 40.18 g of an aqueous solution of nickel nitrate (14.1% w nickel) and 39.93 g of an aqueous solution of ammonium metatungstate (67.26% w tungsten) were combined and the resulting mixture was diluted with water (34.6 g) and then homogenized. The pellets were impregnated with the homogenized mixture (69.7 ml), dried at ambient temperature (20° C.) for 4 hours and then at 120° C. for 2 hours and finally calcined for 2 hours at 500° C. The pellets contained 4% w nickel and 19% w tungsten (hydrogenation components), based on total dry composition.

Comparative Example A

A catalyst composition outside the scope of the present invention was prepared as described in Example 1 above except that the pellets impregnated in step (ii) contained 50% w zeolite beta (silica to alumina molar ratio 114; crystal size in the range 30 to 50 nm (300 to 500 Ångstroms)) and 50% w alumina, on a dry weight basis. The catalyst composition contained 4% w nickel and 19% w tungsten, based on total dry composition.

Comparative Example B

A catalyst composition outside the scope of the present invention was prepared as described in Example 1 above except that the pellets impregnated in step (ii) contained 50% w of an ultrastable zeolite Y (silica to alumina molar ratio 9.5; unit cell size ($a_o$) of 2.432 nm (24.32 Ångstroms)) and 50% w alumina, on a dry weight basis. The catalyst composition contained 4% w nickel and 19% w tungsten, based on total dry composition.

EXAMPLE 2

The hydrocracking performance of the catalyst composition of Example 1 (hereinafter referred to as Catalyst 1) was assessed in a second stage series-flow simulation test. The testing was carried out in once-through microflow equipment which had been loaded with a top catalyst bed comprising 1 ml C-424 catalyst (commercially available from the Criterion Catalyst Company) diluted with 1 ml of 0.1 mm SiC particles and a bottom catalyst bed comprising 10 ml Catalyst 1 diluted with 10 ml of 0.1 mm SiC particles. Both catalyst beds were presulphided prior to testing.

The test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per liter catalyst per hour (kg.l$^{-1}$.h$^{-1}$), a hydrogen gas/heavy gas oil ratio of 1400 Nl/kg, a hydrogen sulphide partial pressure of 5.6×10$^5$ Pa (5.6 bar) and a total pressure of 14×10$^6$ Pa (140 bar).

The heavy gas oil used had the following properties:

| | |
|---|---|
| Carbon content | 86.69% w |
| Hydrogen content | 13.35% w |
| Nitrogen (N) content | 19 ppmw |
| Added n-Decylamine | 12.3 g/kg |
| | (equivalent to 1100 ppmw N) |
| Total nitrogen (N) content | 1119 ppmw |
| Density (15/4 C) | 0.8789 g/ml |
| Density (70/4 C) | 0.8447 g/ml |
| Molar weight | 433 g |
| Initial boiling point | 349° C. |
| 50% w boiling point | 461° C. |
| Final boiling point | 620° C. |
| Fraction boiling below 370° C. | 2.0% w |
| Fraction boiling above 540° C. | 13.3% w |

Hydrocracking performance was assessed at conversion levels between 20 and 85% w net conversion of feed components boiling above 370° C. The results obtained at 65% w net conversion of feed components boiling above 370° C. are shown in Table I below.

Comparative Example A'

The test procedure of Example 2 was repeated except that a bottom catalyst bed comprising 10 ml of the catalyst composition of Comparative Example A (hereinafter referred to as Catalyst A) diluted with 10 ml of 0.1 mm SiC particles was used. Hydrocracking performance was assessed at conversion levels between 20 and 85% w net conversion of feed components boiling above 370° C. The results obtained at 65% w net conversion of feed components boiling above 370° C. are presented in Table I below.

Comparative Example B'

The test procedure of Example 2 was repeated except that a bottom catalyst bed comprising 10 ml of the catalyst composition of Comparative Example B (hereinafter referred to as Catalyst B) diluted with 10 ml of 0.1 mm SiC particles was used. Hydrocracking performance was assessed at conversion levels between 20 and 85% w net conversion of feed components boiling above 370° C. The results obtained at 65% w net conversion of feed components boiling above 370° C. are presented in Table I below.

TABLE I

| | Catalyst System | | |
|---|---|---|---|
| | C-424/Cat. A | C-424/Cat. B | C-424/Cat. 1 |
| Temp. (°C.) at 65% w net conversion | 375 | 380.5 | 371.5 |
| Product Selectivities (% w on feed) | | | |
| Gas ($C_1$–$C_3$) | 2.1 | 0.9 | 0.8 |
| ($C_4$) | 7.9 | 2.6 | 2.7 |
| Naphtha ($C_5$ - 150° C.) | 57 | 34 | 34 |
| Kerosine (150–250° C.) | 24 | 36 | 36 |
| Gas Oil (250–370° C.) | 9 | 26.5 | 26.5 |
| Iso/Normal ratio of butanes | 2.9 | 2.1 | 2.4 |

It will be observed from Table I that whilst Catalyst 1 (a catalyst composition according to the present invention) and comparative Catalyst B both produced the same high yields of middle distillates with very little $C_1$–$C_3$ gaseous by-product, this was achieved at a lower temperature using Catalyst 1 (371.5° C.) than Catalyst B (380.5° C.) which clearly demonstrates the superior activity of Catalyst 1.

Comparative Example C'

The test procedure of Example 2 was repeated except that a bottom catalyst bed comprising 10 ml of Z-703 hydrocracking catalyst (commercially available from Zeolyst International; hereinafter referred to as Catalyst C) diluted with 10 ml of 0.1 mm SiC particles was used. The temperature required to achieve 65% w net conversion of feed components boiling above 370° C. was found to be 372° C.

EXAMPLE 3

Catalyst 1 and Catalyst C were each subjected to the same pre-ageing treatment in order to simulate a middle-of-run or end-of-run catalyst of about 1 to 1.5 years old. The pre-aged catalysts were then tested, in combination with C-424 catalyst, as described in Example 2 above except that the hydrogen sulphide partial pressure was $5.2 \times 10^5$ Pa (5.2 bar) and the total pressure was $13 \times 10^6$ Pa (130 bar). In each case, the temperature required to achieve 65% w net conversion of feed components boiling above 370° C. was determined and is shown in Table II below along with the figure obtained when using the fresh catalyst.

TABLE II

| | Fresh catalyst | |
|---|---|---|
| | C-424/Cat. 1 | C-424/Cat. C |
| Temp. (°C.) at 65% w net conversion ($T_1$) | 371.5 | 372 |
| | Pre-aged catalyst | |
| | C-424/Cat. 1 | C-424/Cat. C |
| Temp. (°C.) at 65% w net conversion ($T_2$) | 378 | 383 |
| $\Delta T$ ($T_2 - T_1$) (°C.) | 6.5 | 11 |

As will be observed from Table II, the activity loss (as indicated by $\Delta T$) for Catalyst 1 (a catalyst composition according to the present invention) was lower than that for the commercial Catalyst C and demonstrates that the catalyst composition of the invention has very advantageous stability.

EXAMPLE 4

(i) A catalyst composition according to the present invention was prepared by combining a zeolite beta (3.0 g) having a silica to alumina molar ratio of 114 and a crystal size in the range 30 to 50 nm (300 to 500 Ångstroms) with an aluminosilicate of structure type MCM-41 containing organic pore filler (68.7 g) having a silica to alumina molar ratio of 19 and a mesopore diameter of about 2 nm, and with alumina (29.8 g). Water and acetic acid were added and the resulting mixture was mulled and then extruded, together with an extrusion aid, into pellets of cylindrical shape. The pellets were dried statically for 2 hours at 120° C. and then calcined for 4 hours at 535° C. After cooling down, the pellets were washed two times with an aqueous ammonium nitrate (1 mol/l) solution and then dried and calcined as before. The pellets so obtained had a circular end surface diameter of 1.6 mm and a water pore volume of 1.36 ml/g. The pellets comprised 5% w zeolite beta (first cracking component), 50% w MCM-41 aluminosilicate (second cracking component) and 45 % w alumina (binder), on a dry weight basis. (ii) The pellets prepared in (i) above were impregnated with nickel and tungsten as described in Example 1 (ii). The resulting pellets contained 4% w nickel and 20% w tungsten, based on total dry composition.

Comparative Example D

A catalyst composition outside the scope of the present invention was prepared as described in Example 4 above except that the pellets impregnated in step (ii) contained 50 % w MCM-41 aluminosilicate (silica to alumina molar ratio 19; mesopore diameter of about 2 nm) and 50% w alumina, on a dry weight basis.

The catalyst composition contained 4% w nickel and 20% w tungsten, based on total dry composition.

EXAMPLE 5

The hydrocracking performance of the catalyst composition of Example 4 (hereinafter referred to as Catalyst 2) was assessed in a second stage series-flow simulation test. The testing was carried out in once-through microflow equipment which had been loaded with a top catalyst bed comprising 1 ml C-424 catalyst (commercially available from the Criterion Catalyst Company) diluted with 1 ml of 0.1 mm SiC particles and a bottom catalyst bed comprising 10 ml Catalyst 2 diluted with 10 ml of 0.1 mm SiC particles. Both catalyst beds were presulphided prior to testing.

The test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per liter catalyst per hour ($kg.l^{-1}.h^{-1}$), a hydrogen gas/heavy gas oil ratio of 1400 Nl/kg, a hydrogen sulphide partial pressure of $5.6 \times 10^5$ Pa (5.6 bar) and a total pressure of $14 \times 10^6$ Pa (140 bar).

The heavy gas oil used had the following properties:

| | |
|---|---|
| Carbon content | 86.69% w |
| Hydrogen content | 13.35% w |
| Nitrogen (N) content | 19 ppmw |
| Added n-Decylamine | 12.3 g/kg |
| | (equivalent to 1100 ppmw N) |
| Total nitrogen (N) content | 1119 ppmw |
| Density (15/4 C) | 0.8789 g/ml |
| Density (70/4 C) | 0.8447 g/ml |

-continued

| | |
|---|---|
| Molar weight | 433 g |
| Initial boiling point | 349° C. |
| 50% w boiling point | 461° C. |
| Final boiling point | 620° C. |
| Fraction boiling below 370° C. | 2.0% w |
| Fraction boiling above 540° C. | 13.3% w |

Hydrocracking performance was assessed at conversion levels between 20 and 85% w net conversion of feed components boiling above 370° C. The results obtained at 40% w net conversion of feed components boiling above 370° C. are shown in Table III below.

Comparative Example D'

The test procedure of Example 5 was repeated except that a bottom catalyst bed comprising 10 ml of the catalyst composition of Comparative Example D (hereinafter referred to as Catalyst D) diluted with 10 ml of 0.1 mm SiC particles was used. Hydrocracking performance was assessed at conversion levels between 20 and 85% w net conversion of feed components boiling above 370° C. The results obtained at 40% w net conversion of feed components boiling above 370° C. are presented in Table III below.

TABLE III

| | Catalyst System | |
|---|---|---|
| | C-424/Cat. D | C-424/Cat. 2 |
| Temp. (°C.) at 40% w net conversion | 422 | 396 |
| Product Selectivities (% w on feed) | | |
| Gas (C$_1$–C$_3$) | 2.3 | 1.4 |
| (C$_4$) | 1.7 | 2.6 |
| Naphtha (C$_5$ - 150° C.) | 16 | 24 |
| Kerosine (150–250° C.) | 30 | 32 |
| Gas Oil (250–370° C.) | 50 | 40 |
| Iso/Normal ratio of butanes | 0.6 | 2.1 |

Although Catalyst 2 according to the invention shows a slightly reduced (but nevertheless still high) middle distillates yield compared to Catalyst D, its activity, as seen from the temperature data in Table III, is significantly better. Furthermore, analyses of the middle distillates obtained in each of Example 5 and Comparative Example D' show that middle distillates obtained by a process according to the present invention have improved cold flow and combustion properties (see Table IV following). The pour point (as determined by ASTM D 97) is the lowest temperature at which an oil will flow; the freezing point (as determined by ASTM D 1477) is the temperature at which crystals first appear when a liquid is cooled; and the smoke point (as determined by ASTM D 1322) is the maximum height of flame measured in millimeters at which an oil will burn without smoking. Kerosine and gas oil comprise paraffins, naphthenes and aromatics, of which the former have the least tendency to smoke and the latter have the greatest tendency to smoke in a wick-fed appliance. A good quality burning oil should contain a sufficiently high proportion of paraffins and thus a high smoke point.

TABLE IV

| Product | Comp. Example D' | Example 5 |
|---|---|---|
| Kerosine (150–250° C.) | 23 | 30 |
| Smoke point (mm) | | |
| Gas Oil (250–370° C.) | | |
| Smoke point (mm) | 17 | 23 |
| Pour point (°C.) | −18 | −18 |
| Freezing point (°C.) | −8 | −13 |

We claim:

1. A catalyst comprising as first cracking component a zeolite beta having a silica to alumina molar ratio of at least 50 which is in the form of crystals with sizes in the range from 20 to 95 nm, a second cracking component selected from the group consisting of (i) crystalline molecular sieves having pores with diameters greater than 0.6 nm, (ii) crystalline, mesoporous aluminosilicates having pores with diameters of at least 1.3 nm, and (iii) clays, and at least one hydrogenation component.

2. The catalyst composition of claim 1 wherein the zeolite beta has a silica to alumina molar ratio of at least 100.

3. The catalyst composition of claim 1 wherein the zeolite beta is in the form of crystals with sizes in the range from 30 to 50 nm.

4. The catalyst composition of claim 1 wherein the second cracking component is selected from the group consisting of (i) crystalline molecular sieves of structure type FAU, EMT, MOR, LTL, MAZ, MTW, OFF, BOG, AET, AFI, AFO, AFR, AFS, AFY, ATS, VFI and CLO; (ii) crystalline, mesoporous aluminosilicates of structure type MCM-41, MCM-48 and FSM-16; and (iii) clays of the non-pillared smectite type.

5. The catalyst composition of claim 4 wherein the second cracking component is (i) a crystalline molecular sieve of structure type FAU or (ii) a crystalline, mesoporous aluminosilicate of structure type MCM-41.

6. The catalyst composition of claim 4 wherein at least one hydrogenation component is selected from Group VI and Group VIII metals, their oxides and sulphides.

7. The catalyst composition of claim 6 wherein the at least one hydrogenation component is selected from the group consisting of molybdenum, tungsten, cobalt, nickel, platinum and palladium, their oxides and sulphides.

8. The catalyst composition of claim 1 which further comprises an inorganic oxide binder.

9. The catalyst composition of claim 8 wherein the binder is selected from the group consisting of alumina, silica, aluminum phosphate, magnesia, titania, zirconia, silica-alumina, silica-zirconia, silica-boria and mixtures thereof.

10. A process for converting a hydrocarbonaceous feedstock into lower boiling materials which comprises contacting the feedstock with hydrogen at elevated temperature and elevated pressure in the presence of a catalyst composition comprising as first cracking component a zeolite beta having a silica to alumina molar ratio of at least 50 which is in the form of crystals with sizes in the range of 20 to 95 nm; a second cracking component selected from the group consisting of (i) crystalline molecular sieves having pores with diameters greater than 0.6 nm, (ii) crystalline, mesoporous aluminosilicates having pores with diameters of at least 1.3 nm, and (iii) clays; and at least one hydrogenation component.

11. The process according to claim 10 which is carried out at a temperature within the range of from 250° to 500° C. and a total pressure within the range of from $3 \times 10^6$ to $3 \times 10^7$ Pa.

12. The process of claim 10 wherein the zeolite beta has a silica to alumina molar ratio of at least 100.

13. The process of claim 10 wherein the second cracking component is selected from the group consisting of (i) crystalline molecular sieves of structure type FAU, EMT, MOR, LTL, MAZ, MTW, OFF, BOG, AET, AFI, AFO, AFR, AFS, AFY, ATS, VFI and CLO; (ii) crystalline, mesoporous aluminosilicates of structure type MCM-4 1, MCM-48 and FSM-16; and (iii) clays of the non-pillared smectite type.

14. The process of claim 13 wherein the second cracking component is (i) a crystalline molecular sieve of structure type FAU or (ii) a crystalline, mesoporous aluminosilicate of structure type MCM-41.

15. The process of claim 13 wherein the at least one hydrogenation component is selected from Group VI and Group VIII metals, their oxides and sulphides.

16. The process of claim 10 wherein the catalyst composition further comprises an inorganic oxide binder.

* * * * *